Patented Feb. 11, 1941

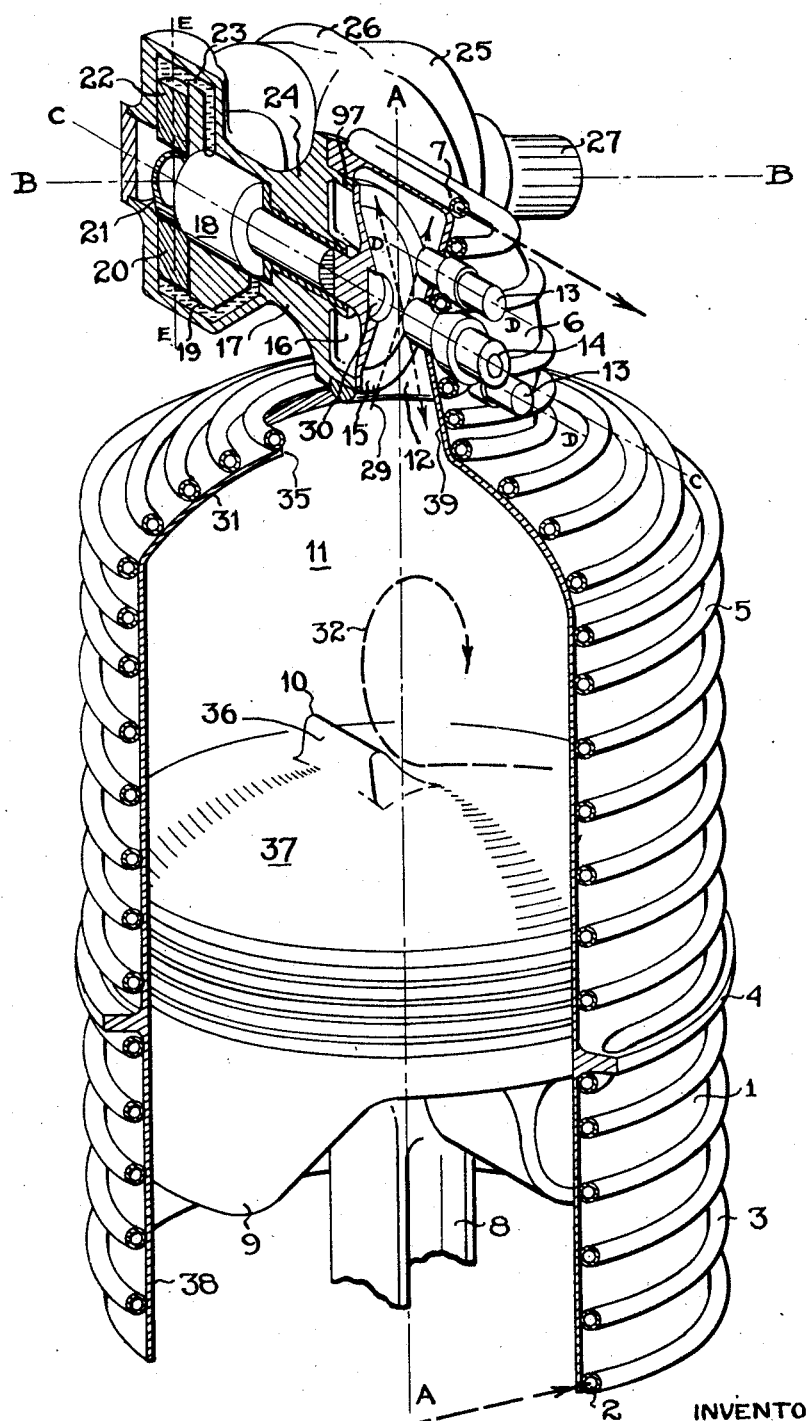
FIG-1-

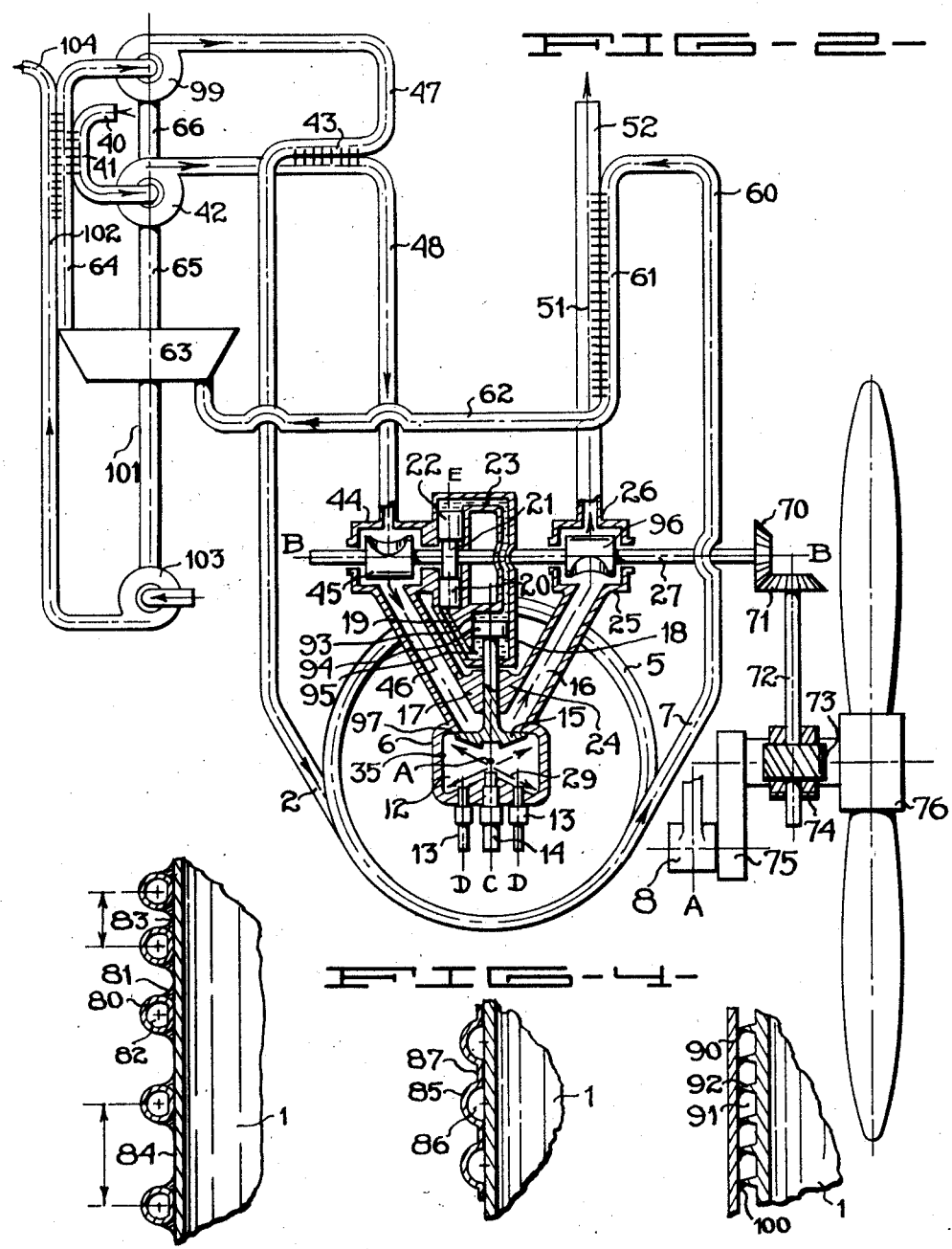

2,231,295

UNITED STATES PATENT OFFICE 2,231,295

POWER PLANT BOILER SYSTEM

Nathan C. Price, Seattle, Wash., assignor to Sirius Corporation, a corporation of California Application March 7, 1938, Serial No. 194,370

4 Claims. (Cl. 123—173)

My invention relates in general to heat transfer apparatus for binary cycle power plant working fluids and to high pressure combustion chambers. It is particularly adaptable to aircraft internal combustion engine power plants for extraction and utilization of by-product heat from combustion chambers fed precompressed air.

In binary cycle power plants the invention provides an advantageous method of heat transfer between working fluids of different temperature levels. It is likewise of value if heat is to be extracted under control from walls of a substantially imperforate combustion cylinder environing a combustion process at relatively high pressure.

The efficiency of power plants for aircraft is of major importance due to the effect of fuel consumption upon the operational range. For instance in transoceanic flights the weight of fuel consumed is frequently several times that of the power plant and is a large fraction of the total aircraft weight.

Aircraft internal combustion engine power plants do at present in certain cases attain thermal efficiencies of 35 per cent, but this figure does not take into account the power consumption involved in cooling the engine, the engine oil, and the supercharged air entering the engine. The aforementioned power is absorbed by drag due to airflow past the radiating surfaces which must be induced by the motion of the aircraft. It is known that at aircraft velocities beyond the sonic, cooling of surfaces by induced air flow becomes increasingly less effective. If the velocity is high enough further increase of air flow actually decreases the heat transfer.

My invention eliminates this wasteful cooling power consumption and puts the heat to good purpose, such as in aiding the propulsion of the aircraft both directly and indirectly by supplying the power for supercharging the combustion chambers. Through the expedients described in this specification power plant thermal efficiency over 50 per cent is obtainable with very little increase in power plant weight and with improvement in power output particularly at the higher altitudes.

The objectives of my invention are hereby enumerated.

First it is desired to provide a method of salvaging waste heat from a primary working fluid of higher temperature level, and means for utilization of this waste heat through a secondary working fluid employed to produce power. The proposition may be characterized by a waste heat utilization system for an internal combustion engine in which the secondary working fluid first extracts heat from a precompressed air charge about to be supplied to the engine cylinder at superatmospheric temperature and pressure, secondly absorbs unwanted heat from the walls of the cylinder and combustion chamber during the compression expansion and exhaust events within the cylinder, and thirdly is superheated by exhaust gases which have issued from the cylinder.

It is an object to conserve the heat ordinarily wasted by air intercooling between a supercharger and the internal combustion engine cylinder. Ordinarily air for cooling the combustion air is forced through the intercooler and exhausted to the atmosphere, representing a grievous heat loss.

Another objective of my invention is to create a cylinder construction which permits an orderly interchange of heat between the primary and the secondary working fluids, such that heat is abstracted evenly about the circumference of the cylinder and such that the secondary fluid is heated to a maximum, nevertheless holding the temperature of the lubricated surfaces of the cylinder at a relatively low temperature. It is essential that localized hot spots in the cylinder and distortion in the cylinder arising from uneven cooling be prevented.

It is a further objective to salvage heat wasted from the cylinder and to eliminate the parasitic aircraft drag involved in the cooling of the supercharged air cooler and engine cylinders.

It is also an objective to provide a cylinder cooling construction of weight far below that of the customary liquid cooled engine cylinder and even substantially less than that of a conventional air cooled cylinder. The construction also permits the use of very high pressure of the secondary working fluid insuring a high thermal efficiency of the secondary working fluid power plant, and yet without involving a high stress in the material bounding the working fluids.

It is likewise an objective to provide an engine cylinder cooling apparatus, which is consolidated and rigidly supported to facilitate compact engine cylinder arrangements and to make the possibilities of engine coolant leakage most remote.

It is desired to incorporate in the cylinder a combustion chamber and appurtenances thereof, designed to promote the advantages of my invention to the fullest extent. This arrangement permits uni-directional temperature gradient to be established in the cylinder and combustion chamber, and the secondary working fluid last leaves the portion of the combustion chamber which may be advantageously operated at the highest temperatures.

The combustion chamber being very compact allows the fuel injection spray to disperse in an ideal pattern of uniform distribution for producing maximum working efficiency of the primary fluid. Also the ignition devices are located to foster the best type of combustion. The valving device yields very high volumetric efficiency and permits optimum arrangements for combustion chamber scavenging, supercharging, fuelization, ignition, and cooling.

It is an object of my invention to improve operational characteristics of internal combustion engines at higher altitudes, where supercharging must be effected at a higher rate, and where the decreased density of the air tends to reduce its ability to cool radiator surfaces.

It is also an objective to provide a system having intrinsic stability such that consumer demands tend to follow producer capabilities. The power available for supercharging will correspond to the power plant waste heat available and therefore will suit the power demand for supercharging regardless of propeller load or operational altitude.

It is an objective to aid the aircraft propulsion by waste heat from the lowest temperature zone of the power plant cycle. Thus heat from the secondary working fluid condenser is contributed to air which is then allowed to expand in a jet for reaction upon the aircraft. I am aware that at lower aircraft velocities jet propulsion is highly inefficient, but I find that even so there is a slight gain in power plant efficiency by using the unavoidable heat loss in this manner. Therefore the installation of a reaction jet is justified at this lowest level of the cycle temperatures. However it would be relatively wasteful to so use heat to propel the aircraft if the heat were extracted from some higher level of cycle temperature.

It is an objective to control the pattern of thermal contact of the secondary working fluid with the primary working fluid in a manner to yield a final condition of the secondary working fluid having minimum entropy, yet with a minimum resultant increase of entropy of the primary working fluid.

These and other objectives are diagrammatically illustrated in the drawings in which:

Figure 1 portrays in perspective an internal combustion engine cylinder of my invention.

Figure 2 represents the flow arrangement of my invention.

Figures 3, 4, and 5 show in section parallel to the cylinder axis preferred structures for conducting the secondary working fluid in thermal contact with the primary working fluid in the cylinder.

An internal combustion engine cylinder 1 of my invention is shown in Figure 1 with a quadrant removed. The cylinder bears a crankcase mounting flange 4 and encompasses a piston 9 and connecting rod 8. The piston 9 is reciprocable along a lubricated cylinder bore 38 and along an axis A in accordance with gaseous forces acting in a sweep space 11. When the piston is in uppermost position a hemispherical crown 37 of the piston engages a hemispherical head 31 of the cylinder with negligible clearance betwixt, so that substantially the entire gaseous volume of the cylinder is displaced into a cylindrical combustion chamber 6, shown in section. An axis C of the chamber 6 intersects and is normal to the axis A.

The approach of the piston 9 to the head 31 during the upward compression stroke tends to trap compressed air between the piston and the head. The air escapes into the chamber 6 through a rectangular orifice 12 between the chamber 6 and the space 11. However a flank 36 of a displacement member 10 extending from the crown 37 closely approaches a lateral edge 35 of the orifice 12 and unbalances the inward rush of air. An air swirl results about the axis C. In Figure 1 the piston 9 has been shown near the bottom of its stroke for clarity of illustration. An eddy 32 represents the configuration of the airflow above the piston and within the chamber 6 when the piston is at uppermost position.

A fuel nozzle 14 on the axis C injects fuel radially from the center of an end 39 of the chamber 6 as illustrated by a spray 29. The fuel is liberated from the center of the air swirl and fills the chamber 6 with a highly atomized and evenly distributed fuel cloud. The air vortex creates turbulence aiding fuel dispersing. A poppet valve 15 and the end 39 opposite thereto are coned in an inward direction toward the axis A in the center of the combustion chamber. Thus stagnant air spaces in the chamber 6 are eliminated and the chamber ends coincide with the natural margin of the fuel spray 29, which in section along the axis C resembles the profile of an hourglass.

Optima combustion efficiency and indicated mean effective pressure are known to be largely dependent upon the degree of perfection of the fuel distribution in the combustion chamber during the combustion process.

If the compression of air in the chamber 6 is sufficiently great, the engine will operate on the compression-ignition cycle. However if the compression is not that high, auxiliary ignition apparatus must be provided. I prefer to use three sparking plugs 13 equally spaced around the nozzle 14 and at about half of the distance toward the circumference of the chamber 6 from the axis C for igniting the fuel spray. The length of flame travel from each plug in the combustible mixture is thereby kept at a minimum. Combustion detonation tendencies are proportional to the length of flame travel from the ignition focus. By preventing detonation, peak gas pressures are kept within desired bounds, and the entropy of the combustion is held relatively low due to the lesser heat dissipation to the combustion chamber walls. Detonation increases the unwanted heat transfer to the walls of the combustion chamber and the cylinder.

The axes D of the plugs 13 are preferably parallel to the axis C of the nozzle 14 and of the chamber 6.

The apparatus for cooling the described cylinder and for producing secondary working fluid comprises a once-through forced circulation boiler tube serpentine or helix 5 generated around the surfaces of the cylinder 1 and the chamber 6.

Secondary working fluid is fed to the tube at an inlet 2 adjacent to the bottom of the cylinder 1. At a region 3 of the helix the secondary fluid is relatively cool and the bore 38 is kept below temperatures which might interfere with proper lubrication between the piston and the cylinder. For instance, the lower portions of the cylinder may be maintained at 250° F.

The temperature of the secondary working fluid at a tube region 5 in the upper portion of the cylinder is increased, for example, to 350° F. The helix 5 then winds around the chamber 6 for absorption of heat at a rather abruptly increased temperature level so that the secondary working fluid may issue from the tube outlet 7 at a temperature of 600° F., for instance. The sparking plugs 13 and the chamber 6 are held at a temperature of, say, 650° F., representing the best compromise between condition of minimum heat dissipation from the primary working fluid, and condition of maximum volumetric efficiency and minimum detonation in the chamber 6. The temperature of the primary working fluid should be reduced as little as possible by wall cooling during the expansion after combustion, for efficiency reasons. Yet if the walls of the chamber 6 are allowed to get too hot, the induction air charge will become overheated, reducing the actual mass of the air supplied during each induction, and promoting a condition of detonation due to excessively rapid combustion.

With the serpentine construction very high velocities are readily maintained in the cooling system controlling the cylinder temperatures in an orderly gradient from the inlet 2 to the outlet 7. This prevents localized hot spots in the cylinder 1 and in the chamber 6.

Typical values for the secondary working fluid pressure using steam are 250 atmospheres at the inlet 2, and 235 atmospheres at the outlet 7. The difference in pressure between the inlet and outlet arises from frictional pressure drop in the fluid flowing at high velocity in the helix. In certain instances the pressure in the helix may be controlled by special pressure regulating mechanisms, as is customary in most boilers, but this is not absolutely necessary. Therefore for simplicity I have illustrated the secondary working fluid system minus special pressure control mechanism. As a result the system pressure varies in response to other conditions such as the rate of heat liberation in the combustion chamber, as well as the output of the feed pump, but this variation does not cause difficulty in the proper cooling of the combustion chamber 6 or of the cylinder 1. Similarly the pressure of the secondary working fluid admitted to the turbine 63 is considerably less than the pressure in the outlet 7 due to frictional pressure drop in the exhaust boiler to be described.

It is not necessary to use working pressures above the critical, but if this is done a weight advantage is realized due to the relatively high thermal conductivity and density of steam at the higher pressures. The higher the thermal conductivity, the smaller the heat transfer surface required. The greater the density, the less the flow cross section area needed.

Accordingly my invention, which is suited to operate at critical pressure, makes available a form of cylinder which is lighter, more compact, and more evenly cooled with a controlled temperature gradient than other forms of combustion cylinder. Furthermore the higher the working pressure of the secondary working fluid, the greater the efficiency of the secondary working fluid power plant.

Figure 2 illustrates the flow diagram of the power plant elements associated with the cylinder 1. The combustion chamber 6 and the valve 15 are portrayed in horizontal section along the axis C.

Atmospheric air supply is drawn by a centrifugal blower 42 along an inlet tube 40 and discharged along an intake tube 48 to an inlet valve housing 44. The air is cyclically admitted by an intake valve 45 to an induction chamber 46 in relation to the cyclical opening of the poppet valve 15. The intake valve 45 opens when the piston 9 is approaching the uppermost position of the exhaust stroke. Then the combustion chamber 6 is scavenged with fresh air and as the piston 9 descends there follows a supercharging of the chamber 6 and the cylinder 1 with compressed air. When the piston 9 reaches lowermost position the poppet valve 15 is abruptly closed against a seat 97 by oil forced by a piston 20 along a channel 19 and working in a space 95 against a piston 94 of the poppet valve. The contrary and opening motion of the poppet valve 15 is attained by oil being forced by a piston 22 along a channel 23 and acting upon the piston 94 in a chamber 93. The pistons 20 and 22 reciprocate in unison along an axis E due to the rotation of a cam 21 placed between them. Thus the motion of the cam 21 is transmited hydraulically to the valve 15. The valve 15 is opened during the latter stages of the expansion stroke in the cylinder 1 and remains open during the succeeding exhaust stroke, during the chamber scavenging, and during the downward induction stroke of the piston 9, and finally is abruptly closed as the piston 9 starts on the upward compression stroke. The described events are for conventional four-stroke cycle operation.

Gases of combustion released from the chamber 6 flow along an exhaust chamber 16 past an exhaust valve 96 in an exhaust valve chamber 25. The gases then issue from an exhaust port 26 and are discharged along a tail pipe 52 to the atmosphere.

A spiral gear 74 is provided on a crankshaft 75 which is rotated by the connecting rod 8 for driving the described valves. The shaft 75 also actuates a propeller 76 for moving the aircraft. The gear 74 rotates a spiral gear 73 and a shaft 72. The power supplied along the shaft 72 is transmitted by some bevel gears 71 and 70 to a valve shaft 27 on an axis B.

The cam 21, the exhaust valve 96, and intake valve 45 are mounted on the shaft 27 and rotate at one half crankshaft speed.

The pistons 20 and 22 and the housing 18 are mounted in a casing 24 attached to the chamber 6. The induction chamber 46 and the exhaust chamber 16 are separated by a septum 17. The septum 17 prevents exhaust gases leaving the chamber 6 from mixing with the supply of compressed air from the chamber 46 during the scavenging period.

The valves 45 and 96 are of the rotary or barrel type and are not lubricated. These valves are given a definite clearance from the housings 44 and 25 and a relatively small amount of continuous compressed air leakage is permitted at all times from the tube 48 to the pipe 52. This valve system has been described in Patent 2,107,389, issued to Nathan C. Price and Marcus Lothrop, February 8, 1938, entitled Engine.

The course of the secondary worfiking fluid commences at a centrifugal pump 99, which draws condensate from a duct 64 being cooled by combustion air at a region 41 of the tube 40 and by reaction jet air of a tube 102. Inasmuch as the pump 99 must at times deliver feed liquid at a pressure exceeding 250 atmospheres it must be designed to operate at very high speed from the turbie 63. Water which has been brought up to a velocity of approximately 750 feet per second in the pump will build up a pressure of approximately 250 atmospheres when properly diffused. Through the use of very high pump speeds the velocity of the water in the pump can be brought to 750 feet per second without necessity for a pump of large physical dimensions. The condensate is forced along the duct 47 to the serpentine inlet 2. At a region 43 of the duct 47 the condensate is heated by the heat of compression of the air issuing from the blower 42. This cools the air being admitted to the cylinder 1.

Secondary working fluid issues from the outlet 7 along a duct 60. The fluid is finally conditioned at a region 61 of the duct 60 by heat transferred from a region 51 of the pipe 52. Thus waste heat from the exhaust gases is salvaged and secondary working fluid at 215 atmospheres pressure and 1100° F., for instance, is conducted along a tube 62 to a turbine 63. The turbine 63 exhausts into the duct 64. Power for operation of the blower 42 and the pump 99 is supplied by the turbine 63.

The turbine also drives a centrifugal blower 103 by a shaft 101. The blower 103 forces air into the heat tube 102. The air is liberated to the atmosphere from a propulsive jet 104. The rate of discharge of the blower 103 is relatively large and the pressure rise relatively small compared to the blower 42. This accounts for the fact that the air from the blower 103 is cool enough to condense secondary working vapor, while the condensate is cool enough to extract heat from the air discharged from the blower 42. The air from the blower 42 is given a relatively large pressure rise in order that it may produce a high specific power output in the cylinder 1. The air temperature rise in the blower 103 may be approximately 50 degrees Fahrenheit for example, while the temperature rise in the blower 42 may frequently exceed 250 degrees Fahrenheit.

In Figure 3 I have illustrated a preferable form of cross section of the helix 5. The helix is composed of a tube 80 wound around the cylinder 1 and having a flow passage 82. The tube 80 may be slightly flattened where it contacts the cylinder. A thermal bonding compound, such as copper, may be applied in a kerf 81. If a region 84 of the cylinder 1 is not subjected to a high rate of heat dissipation, the pitch of the serpentine may be made coarse, while in a region 83 where the heat transmission from the primary working fluid may tend to be relatively great, the pitch may be maintained fine.

In Figure 4 I have illustrated a second preferred construction in which the helix is formed by continuous corrugations in a sheet 85 forming a flow passage area 86. The sheet may be thermally bonded to the cylinder 1 at a flattened region 87 either by copper sweating or by resistance welding.

In Figure 5 I have illustrated a third preferred form of helix comprising a jacket 90, a flow passage area 91, and a fin 92. The fin and the flow passage area are formed by chasing a thread groove in the cylinder 1. The end 100 of the fin is copper sweated to the jacket 90.

I claim:

1. Heat exchange apparatus comprising a thin cylindrical heat conductive shell having a known resistance to bursting under the influence of a higher pressure internally than externally, means to supply a hot fluid under pressure within said shell, a relatively long serpentine tube entwining said shell externally and having a flattened portion thereof abutting said shell, a metallic bonding material sweated between said portion and said shell, and a pump connected to said tube for forcing a relatively cool fluid into said tube at a pressure sufficient to overrule the bursting tendency of said shell, the pressure of said hot fluid being capable of producing said tendency.

2. A heat exchanger comprising a thin heat conductive shell, means for supplying fluid to the interior of said shell at a pressure and temperature sufficiently high to cause said shell to explode, a relatively long serpentine tube wound about said shell, said tube having a flattened portion abutting said shell along a substantial length of said tube and having said flattened portion bearing inwardly against said shell from the exterior thereof, and a pump connected to said tube for forcing a relatively cool fluid into said tube at a pressure sufficient to prevent said shell from exploding.

3. A heat exchanger comprising a pressure vessel of limited bursting strength, means for generating a fluid having high pressure and high temperature within said vessel, said means being operable to burst said vessel, a relatively long serpentine tube wound about said vessel exteriorly thereof and in thermal contact with a substantial portion of the outside of said vessel, and a pump for forcing coolant into said tube at a pressure sufficiently high and at a temperature sufficiently low to prevent said vessel from bursting.

4. Heat exchange apparatus comprising a heated pressure vessel, said vessel having a bursting strength insufficient to withstand the pressure and thermal forces imposed upon it without failure by bursting, a helical channel formed about the exterior of said vessel, said channel having a flattened portion abutting the exterior of said vessel whereby fluid pressure in said channel may oppose expansion tendency of said vessel in an outward direction, and a pump connected to said channel for supplying a continuous flow of fluid at a temperature sufficiently low and at a pressure sufficiently high to prevent said vessel from bursting.

NATHAN C. PRICE.